United States Patent [19]

Giordano

[11] Patent Number: 4,739,724
[45] Date of Patent: Apr. 26, 1988

[54] APPARATUS FOR SELF-SEALING TREATMENT OF PNEUMATIC TIRES

[75] Inventor: Gianfranco Giordano, Rome, Italy
[73] Assignee: Lomax S.r.l., Rome, Italy
[21] Appl. No.: 843,118
[22] Filed: Mar. 24, 1986
[30] Foreign Application Priority Data Mar. 27, 1985 [IT] Italy .................. 47884 A/85
Mar. 27, 1985 [IT] Italy .................. 47885 A/85

[51] Int. Cl.⁴ .................................... B05C 13/02
[52] U.S. Cl. ................... 118/503; 118/320; 118/500
[58] Field of Search ............ 118/503, 320, 232, 409, 118/500

[56] References Cited

U.S. PATENT DOCUMENTS 1,218,155 3/1917 Zimmerman ............... 118/232 X
1,983,684 12/1934 Strong ....................... 118/320 X
4,115,172 9/1978 Baboff et al. ............... 118/409 X

*Primary Examiner*—John P. McIntosh
*Attorney, Agent, or Firm*—Beveridge, DeGrandi & Weilacher

[57] ABSTRACT

An apparatus for use in self-sealing treatment of tubeless tires includes a frame, first and second rotatable tire orienting members movably supported on the frame, a threaded rod assembly, located on the frame, for moving the first and second members on the frame and a motor connected by a transmission assembly, adjustable by a pulley, to the first member for driving that member. The apparatus further includes in upstanding assembly connected to the frame, and an adjustment device including a piston for moving a third rotatable tire orienting member on the upstanding assembly. Each of the rotatable members has a body including two opposing frustum-like portions having an axis of rotation therethrough. The rotational axis of each rotatable member is parallel to those of the other two members. Also disclosed is a sealing composition including an elastomeric contact adhesive and fragmentatious sealing matter which makes up from 5 to 50% of the total volume of the composition. The average size of the fragments of the sealing matter does not exceed 0.5 mm. Further disclosed is a tire treated in accordance with the present invention so that the inside surface thereof is provided with a 2–3 mm thick layer of a sealing composition according to the present invention.

6 Claims, 2 Drawing Sheets

APPARATUS FOR SELF-SEALING TREATMENT OF PNEUMATIC TIRES

BACKGROUND OF THE INVENTION

The present invention relates to an apparatus and a composition for carrying out a self-sealing treatment to impart self-sealing properties to pneumatic tires, and further relates to the tires so obtained. More particularly, the invention relates to an apparatus by which a uniform layer of a self-sealing composition can be applied to the inside surface of the tread of tubeless tires.

Moreover, the present invention pertains to a composition that can be applied to the inside surface of the tread of tubeless tires to form a highly stable adhering layer on the inside surface. The layer is capable of sealing punctures that commonly occur in the tread.

The present invention also relates to tires treated according to the present invention. So treated the tires are sealed against air leakage despite punctures in the tread surface caused by common size nails.

The various problems caused by punctures in the tires of motorcars have been addressed up to the present time by recourse to various pre-treatment or post-treatment systems for the tire.

Without particular reference to the details of post-treatment systems, it should be noted that conventional pre-treatment techniques substantially rely on compositions containing a sealing activity component mixed with adhesive compounds, especially rubber compounds, as well as with a gelling agent such as an olefinic polymer. These compositions are intended for application to the inside surface of the tire before or during other operations on a tire to obtain pneumatic tires which will deflate to a lesser degree as a consequence of a puncture to permit riding on the punctured tire.

A well known composition (see GB Pat. No. 1,570,398) is directed to easier relative slipping between the contacting portions of the inside surface of the tire when the same becomes deflated to pressures down to the order of 1–5 psi (or 0.070–0.35 kg/cm$^2$). The composition is characterized in that it contains as a sealing agent a particle material consisting preferably of rubber granules or "rubber crumb", or of wood dust, with limits on the sizes of the particles and their volume percentages.

However, it is to be noted that the use of sealing materials made up of asbestos fibers or of glass within conventional compositions of the type mentioned above, and suggested in the present invention, are directed to obtaining a faster sealing rate and more complete seal in order to prevent the tire from deflating as a result of punctures. Also, for the full safety of the driver, access to pressure detecting means, for instance to recently developed electronic pressure switches arranged inside the tire could be provided.

SUMMARY OF THE INVENTION

It is an object of the present invention to provide self-sealing pneumatic tires having a coating with a higher sealing rate to prevent or limit deflation as a consequence of punctures.

It is very evident that pneumatic tires according to the present invention are very useful, in particular for armor plated vehicles in addition to devices for enabling riding on punctured tires, or for police or emergency vehicles, or in other situations wherein it is of vital importance to avoid being stopped by a mere puncture.

Moreover, such tires, when employed in combination with electronic pressure switches for detecting the tire pressure, can be used advantageously for ordinary vehicles because such tires reduce or eliminate the risks involved with a puncture and deflation of the tire while the vehicle is moving, and avoid the problems arising from consequent need for replacing a flat tire, especially for disabled persons or persons suffering from a physical disability who experience difficulties in carrying out a tire change operation.

Moreover, it is an object of the present invention to provide a composition which is characterized by a very strong adhesive power that provides a perfect and permanent adhesion to the inside surface of the tire, as well as adhesion to a penetrating object as it is withdrawn from the tire so that the composition concentrates in the punctured area, together with easy adhesion of the sealant sides to one another on their contact during the cyclic deformation of the tire.

It is a further objection of the present invention to provide a composition having a viscosity so as to avoid circumferential slipping inside the tire while providing for a rapid flow in the event of a puncture in the protected area, together with a high elasticity so that the composition has the property of following the piercing object and acting as a plug.

It is also an object of the present invention to provide an apparatus which can be employed in a workshop for the treatment of tires on a large or a small scale, with self-sealing compositions. The apparatus also is suitable for homogeneously applying a layer of the composition to the inside surface of the tread of any tubeless tire without changing the balance of the tire.

Moreover, it is also an object of the present invention to provide an apparatus of the type mentioned above, which apparatus is suitable for carrying out the application operation according to critical parameters, especially as regards the application rate and uniformity. These parameters change as functions of the tire size and the characteristics of the composition to be applied.

As will be understood by those of ordinary skill in the art, it is necessary to apply a larger amount of the disclosed composition to larger tires, so the tires must be rotated at higher speeds.

It is a further object of the present invention to provide a tire treated with a self-sealing composition wherein the original characteristics of the tire are unchanged, except for a negligible increase in weight attributed to the composition applied thereto. The tire is also capable of resisting the puncture effects when extraneous objects with diameters between 1 and 5 mm pierce the area of the tread.

It is a further object of the present invention to provide an electronic pressure switch, inside the tire, for detecting the tire pressure so that the vehicle driver will be made aware of any substantial deflation of the tire.

Thus, it is a specific object of the present invention to provide an apparatus for carrying out a treatment to impart self-sealing properties to tubeless tires. The apparatus comprises frame means and three rotatable members which are parallel to one another and have bodies, provided in the form of two opposed frustums. One of the members is driven while the two other members are idle. The driven member and one of the two idle members are slidable on the frame means and the other of the two idle members is slidably mounted on vertical upright means connected to the frame means. The apparatus includes motor means and transmission means for causing the driven member to rotate, threaded rod means for adjusting the position of the two members on the frame means means for adjusting the position of the idle member on the upright means, and means for adjusting the transmission means.

Again according to the present invention, the rotatable members have body portions shaped as two opposed frustums with an incline between 25° and 45°.

According to a preferred embodiment of the apparatus of the present invention, the transmission means has a variable gear ratio. In this way the rotational speed of the driven member can be adjusted according to the sizes of the tires to be treated. The tires are held between the three members while the treatment proceeds.

Preferaby the motor is an electric motor with a rotational speed between 1,500 and 6,000 rotations per minute.

The means for adjusting the position of the idle member on the upright means advantageously can be a pneumatic or a hydraulic piston acting vertically on the idle member.

It is a further object of the present invention to provide a composition for imparting self-sealing properties to tubeless tires. The composition comprises an elastomeric contact adhesive which is made up of a butyl rubber and a sealing material that is made up of asbestos fiber fragments or of glass fragments, the average sizes of which are not greater than 0.5 mm.

Preferably, the sealing material is present in amounts of from 5 to 50% of the total volume of the composition.

Preferably, a butyl rubber is employed that consists of polyisobutylene and polyisoprene. With the latter butyl rubber, a percentage of the sealing agent of 17% was shown to be particularly advantageous.

Thus, according to the present invention a composition is obtained which provides improved sealing and has physical as well as chemical properties which are particularly suitable for the employment of the composition.

The composition according to the present invention softens in the temperature range 119° C. to 135° C., wherein the latter temperature corresponds to the liquid state of the composition. At cool temperatures the composition remains flexible and also unalterably retains its adhesive and sealing properties down to a temperature of −40° C.

The physical stability is equivalent to that of the tire itself. Theoretically, light superficial scorings can be expected to occur after one or two years of storage; however, they are of no technical importance and they should disappear within the first 5 kilometers of use of the tire.

The product has a viscosity which is high enough to avoid circumferential slipping inside the tire while the motor vehicle is moving, even at a high speed, so that, the balancing of the wheel/tire assembly remains unchanged, but the viscosity is also low enough to allow the sealant to flow rapidly in case of a puncture in the protected area.

According to the present invention, the product is given optimal adhesion properties which are very advantageous in ensuring that:

a permanent adhesion occurs between the layer of the sealing agent and the inside surface of the tire, the product adheres to the piercing object, also when the object is withdrawn from the tire, the product also is able to concentrate in the punctured area so as to plug the same, and in the case of punctures wide enough and/or shaped so as to cause a laceration or gash in the sealant layer, the sticking of the sealant sides is made easier when they contact each other during the cyclic deformation of the tire.

The composition according to the present invention has a high elasticity with a tendency to return to its position when the film inside the tread is pierced. This property gives the sealant the capability of following the motion of a piercing object when the object remains within the tire and after the object has been withdrawn from the tire, as well as of acting as an elastically deforming plug which will not crack despite the cyclic deformation of the puncture hole while the vehicle is moving.

The product according to the present invention is slightly souluble in gasoline or in similar hydrocarbons. Moreover, the butyl rubber in its composition gives rise to a useful affinity with the inside coating layer of the tire.

Moreover, it is a specific object of the present invention to provide a tubeless tire treated according to the present invention with the apparatus disclosed above, such tire being characterized in that the composition disclosed is provide as a layer on the inside surface of the tire tread.

Preferably, the layer of the self-sealing composition has a thickness between 2 and 3 mm.

Again according to the present invention an electronic pressure switch is provided inside the tire, which pressure switch is designed for meansuring the pressure within the tire.

BRIEF DESCRIPTION OF THE DRAWINGS

The apparatus according to the present invention will be described in the following with reference to the preferred embodiment wherein like parts bear like reference numerals. In the drawings.

DETAILED DESCRIPTION OF THE PREFERRED EMBODIMENTS

Figure 1:
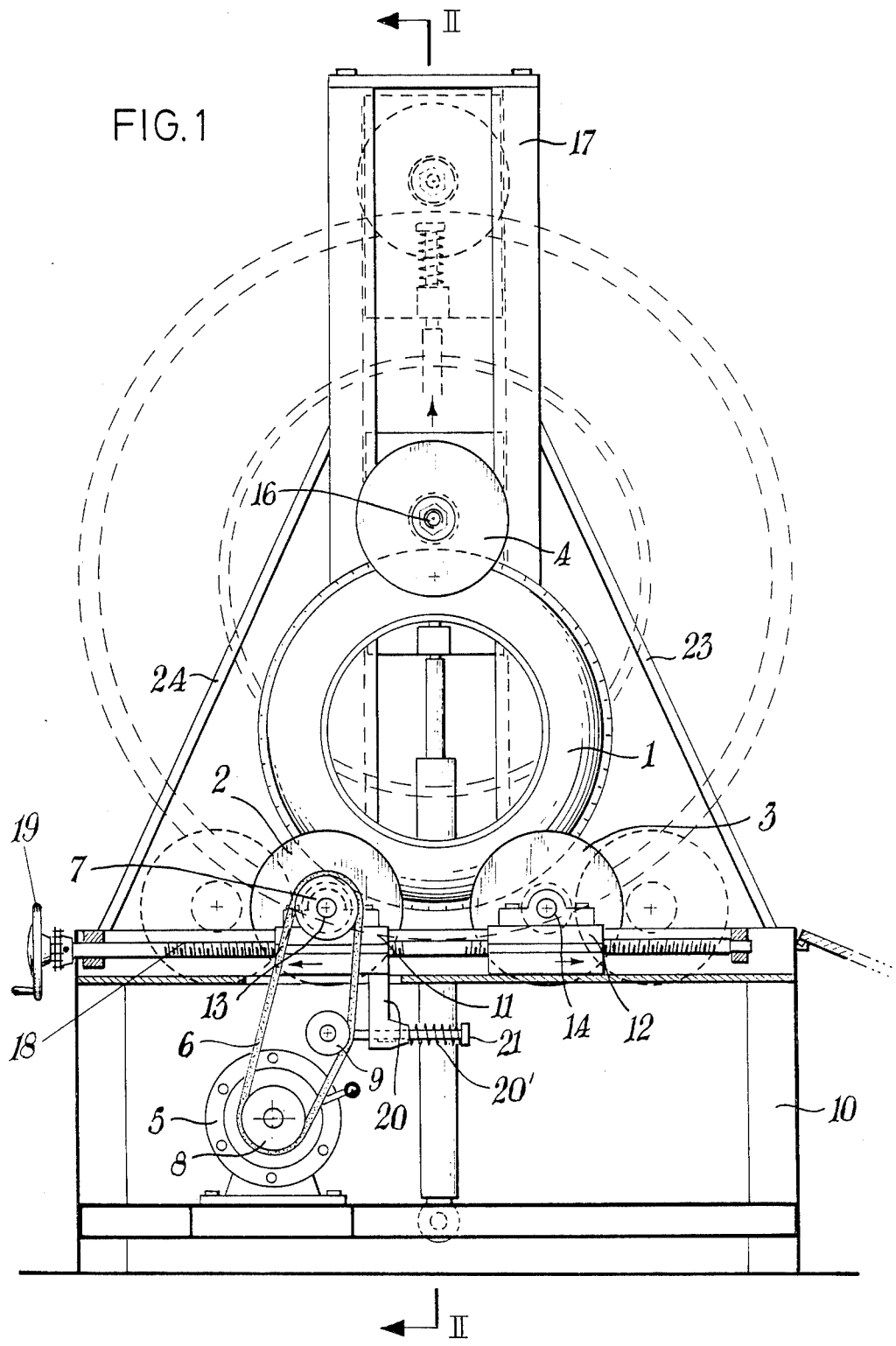
FIG. 1 is a front, elevational view of an apparatus according to the present invention.

With reference now to both figures, a tire 1 is oriented vertically by three members 2, 3 and 4 each of which has a body arranged in the shape of two opposed frustums.

Due to their shape, the three members 2, 3 and 4 hold the tire 1 in its vertical orientation during the application procedure. The two opposed frustums of each of members 2, 3 and 4 have an incline of from about 25° to about 45°. Due to the shape of members 2, 3 and 4, the tire 1 is drawn into the vertical orientation automatically regardless of its initial position.

The member 2 is driven by an electric motor 5 by means of the driving belt 6, pulleys 7 and 8 and a pulley 9 which is provided for adjusting the tension on the belt 6.

The members 3 and 4 are idle. The members 3 and 4 cooperate with the member 2 to hold the tire 1 so that the tire can be rotated by driven member 2.

The apparatus according to the present invention is supported by a frame 10 which is provided with two supports 11 and 12 in which the shafts 13 and 14 of members 2 and 3 are journalled.

The upper member 4 is in turn supported on a horizontal suspension post or upright 15 which permits rotation of the shaft 16 and which is slidable along a vertical upright 17. The upright 17 is oriented at right angles with respect to the shafts 13, 14 and 16.

Various means are provided for adjusting the position of members 2, 3 and 4 in order to accommodate tires of different sizes such that the apparatus according to the invention is adapted for processing all types of tubeless tires commercially available.

The position of the supports 11 and 12 for the members 2 and 3 can be adjusted by means of the threaded rod 18 which is rotatable by the handwheel of crank 19.

In order to ensure that the driving belt 6 remains tensioned, an arm 20 is provided and connected to the support 11. The arm is counteracted by the spring 20'. The arm 20 determines the position of the tensioning pulley 9 by action on the horizontal pin 21.

The elevation of the upper member 4 is adjustable by means of a pneumatic piston 22. The member 4 is slidable along the upright 17 with the horizontal upright or suspension post 15 that supports the member. The post 15 is connected at a position behind upright 17 to piston 22 for movement of the member 4 to an elevated position according to the type of tire to be processed.

The two inclined tension rods 23 and 24 are provided between frame 10 and horizontal upright 17 in order to strengthen or stiffen the apparatus.

Figure 2:
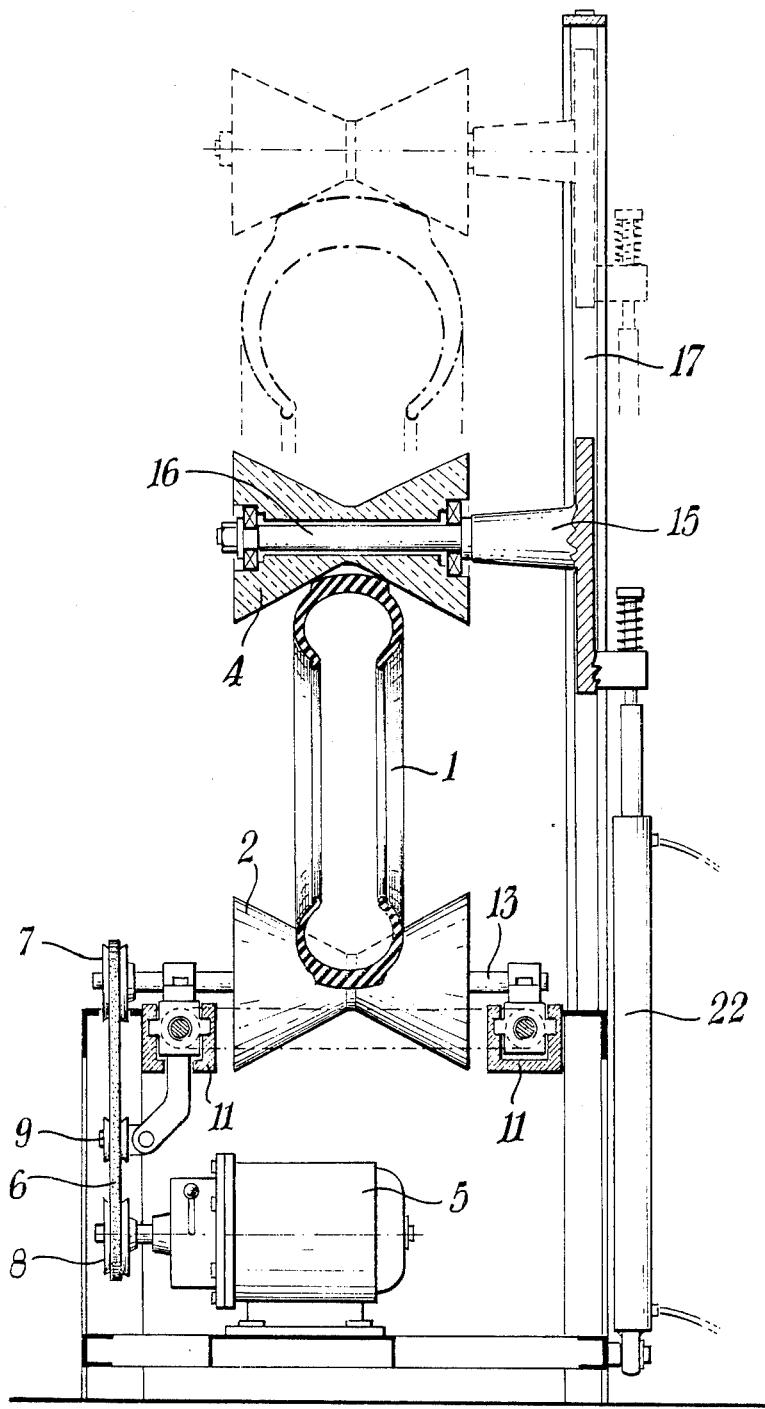
FIG. 2 is a cross-sectional view along line II-II of the apparatus of FIG. 1.

The dashed lines in FIGS. 1 and 2 illustrate the relative positions of member 2, 3 and 4 to accommodate a tire of different (larger) size.

The composition according to the present invention is applied by a spray gun. The rotational speed of the tire is selected to be of such value as to provide a centrifugal force sufficient to distribute a uniform layer of the composition before the composition solidifies. The uniform layer should have a thickness of from 2 to 3 mm. As is apparent to those of ordinary skill in the subject art, the apparatus of the present invention can be provided with means for changing the rotational speed of the tire to satisfy a need for applying a greater amount of the composition according to the present invention to a larger size tire for example.

The weight of the composition applied can be from about 250 g to about 1,500 g according to the size of the tire. The weight of the composition therefore is negligible with respect to the tire weight.

As regards the composition of the invention, reference is now made to examples provided for illustrative but not for limitative purposes. The examples detail how the composition is prepared and discuss the results of tests for puncture resistance of tires treated with the composition.

EXAMPLE 1

Preparation 1

An elastomeric adhesive consisting of a butyl rubber was heated until it liquified (125°–135° C.); next an amount was added corresponding to 17% by volume of asbestos fibers, the average sizes of which did not exceed 0.5 mm, then the mixture was stirred and filtered through a filter with openings of 0.5 mm. The filtered mixture was permitted to cool until it solidified.

EXAMPLE 2

Preparation 2

Operations were performed as in the case of example 1, with the exception of employing, as the sealing material, a percentage of 28% by volume of glass fibers and subjecting the mixture, after it had been filtered, to a further mixing action in order to obtain a more homogeneous distribution of fibers.

EXAMPLE 3

Puncture Resistance Tests

Tests were carried out employing prick punches of diameters from 1 to 5 mm and of lengths from 5 to 6 cm. the punches were inserted vertically into the body of the tread of a tire processed according to the present invention. The tire pressure was measured before and after insertion of the punch and after the extraction of the punch.

(A) The Goodyear 185/70/14 tire

Four prick punches of the type specified above and of diameters of 1, 2, 3 and 4 mm were inserted respectively into four tires of the specified make and type after the inside surface of their treads was coated with a 2-3 mm thick layer of the composition made according to example 1.

After 10 minutes, no change was observed in the pressure (2 atm or 2 kg/cm$^2$) measured before the insertion of the punches. The punches were then extracted and the pressure was determined after 15 minutes. A pressure decrease of 0.1 atm (0.1 kg/cm$^2$) was observed for the second tire only.

(B) The Pirelli P6/195/60/14 tire

The test performed in (A) was repeated measuring the pressure 15 minutes after the introduction of the prick punches but no change was observed in the starting pressure (2 atm). The next determination of the pressure value was performed 30 minutes after extracting the punches, and no substantial change was observed in the pressure.

The preferred embodiments of the present invention have been disclosed for illustrative purposes only and it is to be understood that modifications and changes can be introduced by those who are skilled in the art without departing from the spirit and scope of the invention for which priority rights are claimed.

I claim:

1. An apparatus for use in carrying out a process to impart self-sealing properties to tubeless tires, said apparatus comprising:
   frame means;
   upstanding means connected to said frame means;
   first and second rotatable tire orienting members movably supported on said frame means;
   threaded rod means on said frame means for slidably moving said first and second members on said frame means;
   motor means;
   transmission means for transmitting rotational motion from said motor means to said first member for driving said first member; said transmission means including adjustment means;
   a third rotatable tire orienting member supported on said upstanding means; and
   third member adjustment means for slidably moving said third member on said upstanding means, each of said rotatable members having a body portion including two opposing frustum-like portions with an axis of rotation therethrough, each of said axes being in parallel with the others of said axes.

2. An apparatus according to claim 1, wherein the frustum-like portions of said rotatable members are inclined between 25° and 45°.

3. An apparatus according to claims 1 or 2, wherein said transmission means is of the variable gear ratio type.

4. An apparatus according to claim 1, wherein said motor means comprises an electric motor having a rotational speed of from 1,500 and 6,000 rotations per minute.

5. An apparatus according to claim 1, wherein said third member adjustment means is a pneumatic piston for vertically moving said third member.

6. An apparatus according to claim 1 wherein said third member adustment means is a hydraulic piston for vertically moving said third member.

* * * * *